(12) United States Patent
Oroskar

(10) Patent No.: US 9,345,031 B1  
(45) Date of Patent: May 17, 2016

(54) SELECTING A FREQUENCY FOR A WIRELESS COMMUNICATION DEVICE FROM NON-OVERLAPPING FREQUENCY BANDS

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/711,432

(22) Filed: May 13, 2015

Related U.S. Application Data

(63) Continuation of application No. 13/495,375, filed on Jun. 13, 2012.

(51) Int. Cl.
 *H04W 72/00* (2009.01)
 *H04W 72/04* (2009.01)
 *H04W 72/08* (2009.01)

(52) U.S. Cl.
 CPC ...... *H04W 72/0453* (2013.01); *H04W 72/0406* (2013.01); *H04W 72/048* (2013.01); *H04W 72/08* (2013.01)

(58) Field of Classification Search
 CPC ............. H04W 72/0453; H04W 72/08; H04L 72/0406
 USPC ........................................ 455/452.1; 370/338
 See application file for complete search history.

(56) References Cited

U.S. PATENT DOCUMENTS

| | | | |
|---|---|---|---|
| 6,848,012 B2* | 1/2005 | LeBlanc et al. | 710/52 |
| 2006/0199544 A1* | 9/2006 | Ramakrishna et al. | 455/67.11 |
| 2010/0167752 A1* | 7/2010 | Kojima | 455/452.2 |
| 2012/0064873 A1* | 3/2012 | Farnsworth | 455/418 |
| 2012/0236822 A1* | 9/2012 | Fang et al. | 370/331 |

\* cited by examiner

*Primary Examiner* — Marcos Batista

(57) ABSTRACT

A radio access network (RAN) may receive indications from a wireless communication device (WCD). The RAN may support wireless communication via a plurality of non-overlapping frequency bands, and the plurality of non-overlapping frequency bands may include a low-frequency band and a high-frequency band. The low-frequency band and the high-frequency band may be separated by at least 5 megahertz. The indications may indicate signal strengths at which the WCD received signals from one or more frequencies in the low-frequency band and one or more frequencies the high-frequency band. The RAN may also receive a communication request from the WCD. Based at least in part on receiving the communication request, the RAN may select a frequency from the one or more frequencies in the low-frequency band and the one or more frequencies in the high-frequency band, and may instruct the WCD to communicate using the selected frequency.

20 Claims, 5 Drawing Sheets

SELECTING A FREQUENCY FOR A WIRELESS COMMUNICATION DEVICE FROM NON-OVERLAPPING FREQUENCY BANDS

CROSS-REFERENCE TO RELATED APPLICATION

This application claims priority to U.S. patent application Ser. No. 13/495,375, filed Jun. 13, 2012, which is hereby incorporated by reference in its entirety.

BACKGROUND

Wireless service providers typically design their wireless networks to comprise a number of partially-overlapping wireless coverage areas. A radio access network (RAN) may assign one or more frequencies from these wireless coverage areas to wireless communication devices (WCDs) so that these WCDs can communicate using the assigned frequencies.

OVERVIEW

In some cases, a RAN may support frequency bands in non-contiguous parts of the frequency spectrum. For instance, the RAN may be able to provide wireless service in a frequency band at or around 800 megahertz (MHz) and in another frequency band at or around 1900 MHz. Due to the different physical properties of frequencies in these frequency bands, it may be beneficial for the RAN to allocate a frequency from one band or the other to a WCD for communication.

For example, signals propagating on a lower frequency may be subject to less attenuation than signals propagating on a higher frequency. Consequently, a WCD using the lower frequency may experience better signal strength, higher bit rates, fewer dropped calls, and/or fewer handoffs than a WCD using the higher frequency. Thus, when a WCD can communicate using either a frequency in a low-frequency band or a frequency in a high-frequency band, it may be beneficial for the RAN to allocate a frequency in the low-frequency band.

However, the RAN might not be able to allocate frequencies in the low-frequency band to every WCD requesting service without overloading the low-frequency band. Therefore, when determining the frequency band from which to allocate a frequency to the WCD, the RAN may consider various factors.

One of these factors may be signal strengths that the WCD has reported for frequencies in each frequency band. If the WCD does not receive signals on frequencies in the high-frequency band at a sufficient strength, the RAN may select a frequency from the low-frequency band for assignment to the WCD. On the other hand, if the WCD does not receive signals on frequencies in the low-frequency band at a sufficient strength, the RAN may select a frequency from the high-frequency band for assignment to the WCD. Further, if the WCD does not receive signals from at least a threshold number of wireless coverage areas defined in the low-frequency band, the RAN may select a frequency in the high-frequency band.

Another factor may be whether the WCD is in motion. A moving WCD is less likely to be handed off if it is communicating via the low-frequency band. Therefore, if the RAN determines that the WCD is moving at a rate above a threshold rate (e.g., at more than n meters per second), the RAN may allocate a frequency from the low-frequency band to the WCD.

Yet another factor may be the type of media codecs that the WCD is capable of supporting. For instance, some WCDs are capable of supporting high-definition voice codecs that may use, e.g., sampling rates of over 8,000 Hertz (Hz). The lower attenuation rates of the low-frequency band may make it more likely that the WCD can successfully utilize an advanced media code, such as a high-definition voice codec. Additionally, WCDs that support advanced codecs may be associated with premium-level subscribers of the wireless service provider. A premium-level subscription may further justify allocating a frequency from the low-frequency band to the WCD if the WCD is capable of supporting an advanced codec.

Accordingly, in a first embodiment, a RAN may receive one or more indications from a WCD. The RAN may support wireless communication via a plurality of non-overlapping frequency bands, and the plurality of non-overlapping frequency bands may include a low-frequency band and a high-frequency band. The low-frequency band and the high-frequency band may be separated by at least 5 megahertz. The indications may indicate signal strengths at which the WCD received signals from one or more frequencies in the low-frequency band and one or more frequencies in the high-frequency band.

The RAN may also receive a communication request from the WCD. Based at least on (i) receiving the communication request, and (ii) the signal strengths, the RAN may select a frequency from the one or more frequencies in the low-frequency band and the one or more frequencies in the high-frequency band. The RAN may instruct the WCD to communicate using the selected frequency.

A second example embodiment may include a non-transitory computer-readable storage medium, having stored thereon program instructions that, upon execution by a computing device, cause the computing device to perform operations in accordance with the first example embodiment.

A third example embodiment may include a RAN device, comprising at least a processor and data storage. The data storage may contain program instructions that, upon execution by the processor, cause the RAN device to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
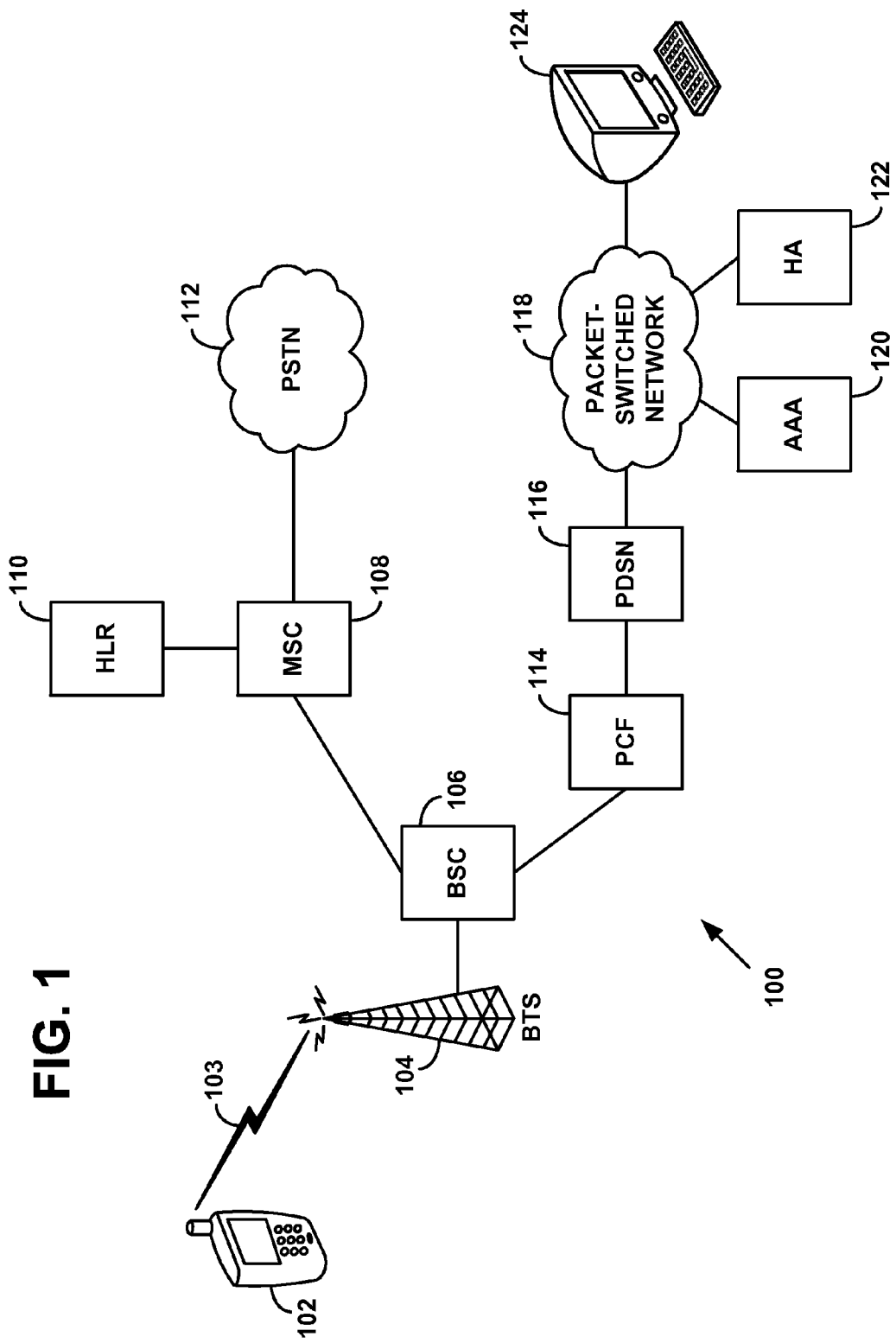
FIG. 1 depicts a RAN, in accordance with an example embodiment.

FIG. 1 shows a simplified block diagram of a wireless communication system 100 in which example embodiments can be employed. WCD 102 may communicate over an air interface 103 with a base transceiver station (BTS) 104, which is, in turn, coupled to or integrated with a base station controller (BSC) 106. Transmissions over air interface 103 from BTS 104 to WCD 102 may represent a "forward link" to the WCD. Conversely, transmissions over air interface 103 from WCD 102 to BTS 104 may represent a "reverse link" from the WCD.

BSC 106 may be connected to a mobile switching center (MSC) 108. BSC 106, MSC 108, or both, may act to control assignment of air interface traffic channels to WCDs, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124. After acquiring a traffic channel over air interface 103, WCD 102 may transmit a request to PDSN 116 for a connection to the packet data network. Then, following authentication of WCD 102 by AAA server 120, WCD 102 may be assigned an IP address by the PDSN or by HA 122, and may thereafter engage in packet-data communications with entities such as remote computer 124.

In some deployments, the combination of elements including BTS 104, BSC 106, and MSC 108 may be referred to as a RAN. However, a RAN may contain more or fewer elements. For instance, some RANs may also include HLR 110, PCF 114, PDSN 116, and/or other elements not shown in FIG. 1.

Figure 2:
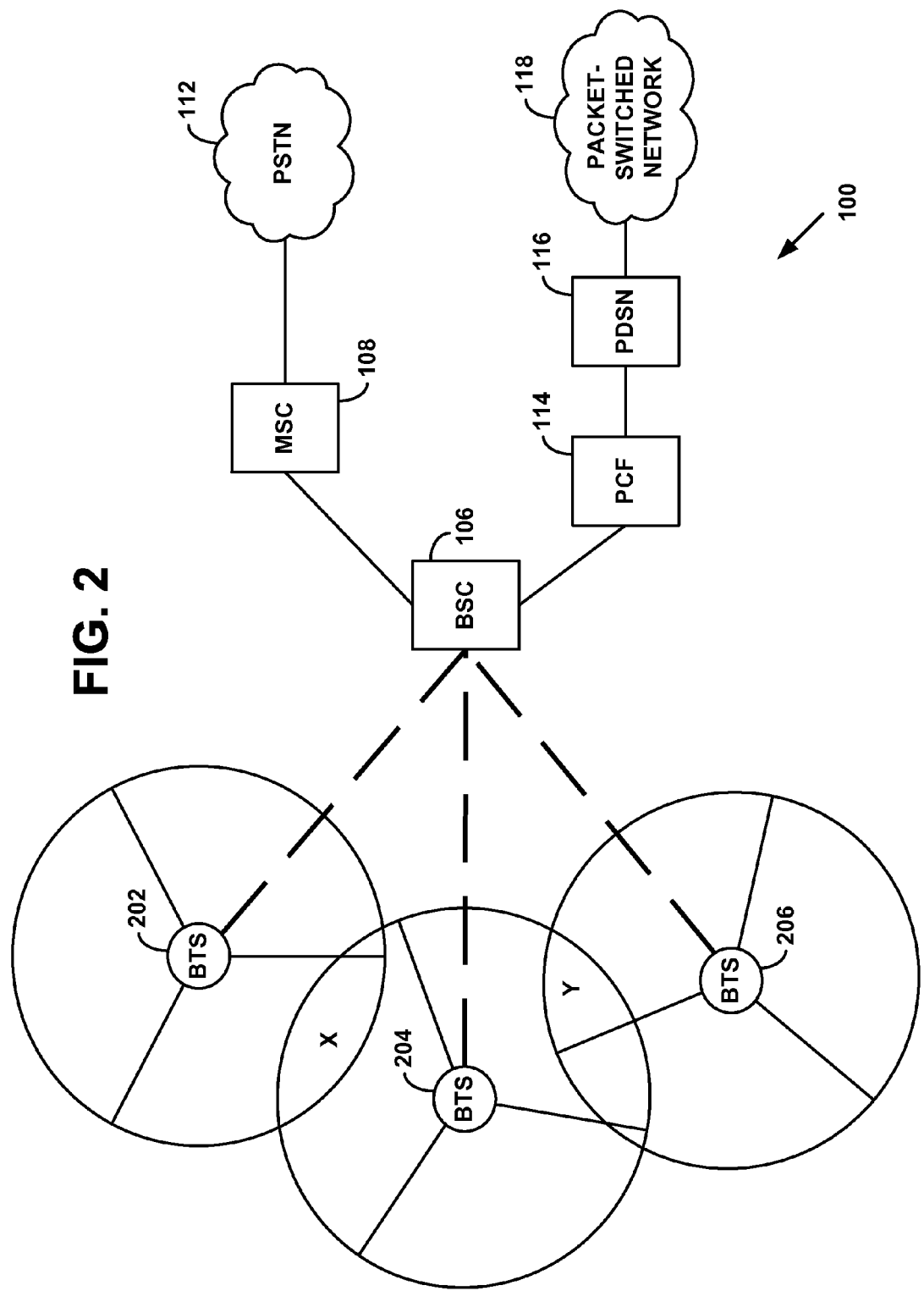
FIG. 2 depicts a RAN radiating to define several wireless coverage areas, in accordance with an example embodiment.

In practice, a BSC may serve multiple BTSs, each of which may then radiate to define a wireless coverage area. Each wireless coverage area, in turn, may comprise a plurality of wireless coverage areas. This arrangement is illustrated in FIG. 2, which shows BSC 106 in network 100 coupled with BTSs 202, 204, and 206. Each BTS is shown at the core of a respective circle representing a wireless coverage area, and each wireless coverage area is divided into three pie-shaped pieces representing wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas for each of the BTSs in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, wireless coverage areas need not be circular, and may take on other shapes and arrangements instead.

A WCD may receive the same bearer data simultaneously from more than one wireless coverage area. To illustrate that point, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
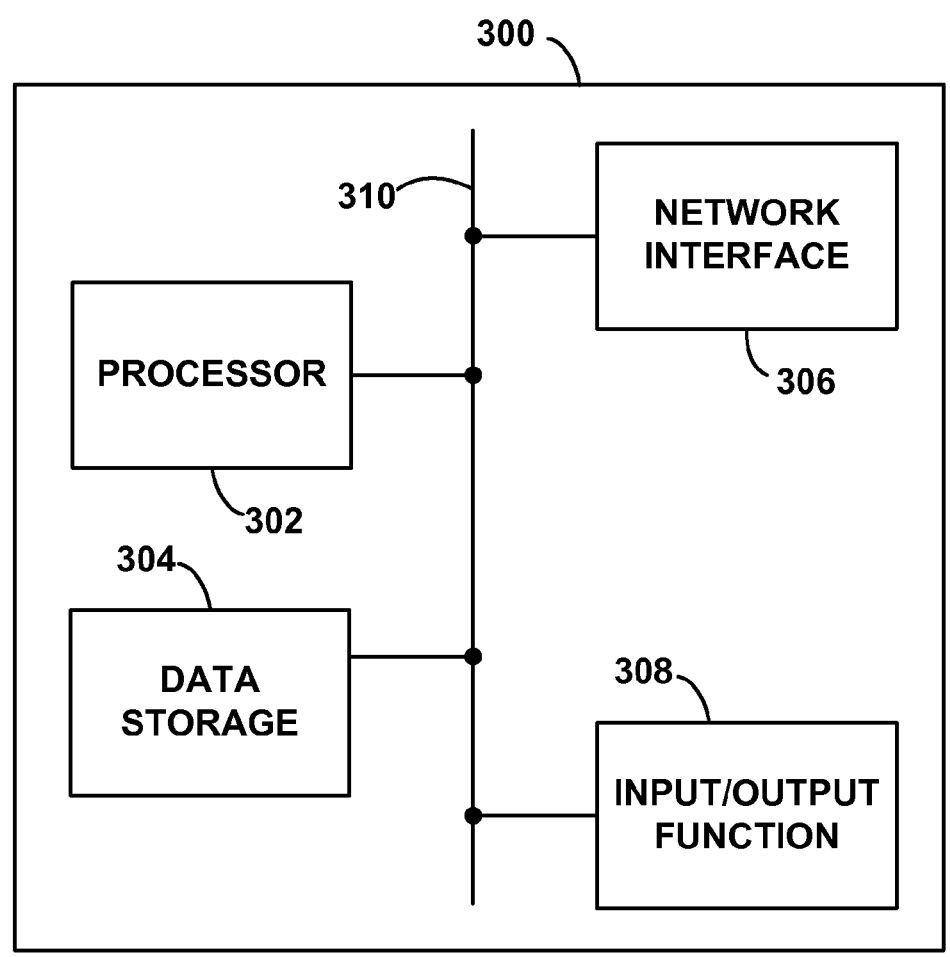
FIG. 3 is a block diagram of a RAN device, in accordance with an example embodiment.

FIG. 3 is a simplified block diagram exemplifying a RAN device 300, illustrating some of the functional components that could be included in a RAN device arranged to operate in accordance with the embodiments herein. Example RAN device 300 could be any type of device found in or associated with a RAN, such as a BTS, a BSC, or an MSC. For purposes of simplicity, this specification may equate RAN device 300 to a BSC from time to time. Nonetheless, it should be understood that the description of RAN device 300 could apply to any component used for the purposes described herein.

In this example, RAN device 300 includes a processor 302, a data storage 304, a network interface 306, and an input/output function 308, all of which may be coupled by a system bus 310 or a similar mechanism. Processor 302 can include one or more CPUs, such as one or more general purpose processors and/or one or more dedicated processors (e.g., application specific integrated circuits (ASICs) or digital signal processors (DSPs), etc.).

Data storage 304, in turn, may comprise volatile and/or non-volatile data storage and can be integrated in whole or in part with processor 302. Data storage 304 can hold program instructions, executable by processor 302, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions, perhaps stored on a non-transitory computer-readable medium, executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN device 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN device 300 may support remote access from another device, via network interface 306 or via another interface (not shown), such an RS-232 or USB port.

II. CDMA Communications

For purposes of illustration, an example that uses Code Division Multiple Access (CDMA) communications will be described. However, it should be understood that other examples could use other protocols and/or functions now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be allocated dynamically to WCDs for use as traffic channels.

Channel assignment to WCDs, which typically involves allocating one or more resources of a wireless coverage area to the WCDs, may occur when a new call (e.g., a voice, video, music, and/or data session) is established involving the WCD, or when the WCD hands off to a different wireless coverage area. Each of these scenarios is described below.

a. Idle Handoff and Call Establishment

Each BTS of a RAN may emit a pilot channel signal in each wireless coverage area the respective BTS defines. Based on these pilot channel signals, an idle WCD (e.g., a WCD not involved in a call) may associate with a primary wireless coverage area, and then listen to the paging channel of the primary wireless coverage area for incoming call indications, and other information, from the RAN. The RAN may transmit system parameter messages and/or neighbor list update messages to the WCD via this primary paging channel. These messages may identify PN offsets of the pilot channels emitted by BTSs that define neighboring wireless coverage areas (e.g., wireless coverage areas defined by the RAN's BTSs or wireless coverage areas defined by nearby BTSs in different RANs).

An idle WCD may measure the pilot channel signal strength that it receives from each of these neighboring wireless coverage areas. If, for some period of time, the WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and associate with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

b. Soft Handoff

During a call, a WCD may communicate substantially simultaneously via a number of "active" wireless coverage areas at a time. Herein, the term "substantially simultaneously" may be used to describe communications involving two or more discrete messages that pass through two or more different intermediate points at approximately the same time, such as within a few tens of milliseconds or less.

Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but are in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

The WCD may continuously, or from time to time, measure the strength of each pilot channel signal that it receives and may notify the RAN when a received pilot strength is above or below designated thresholds. More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

III. Example Operations

Figure 4:
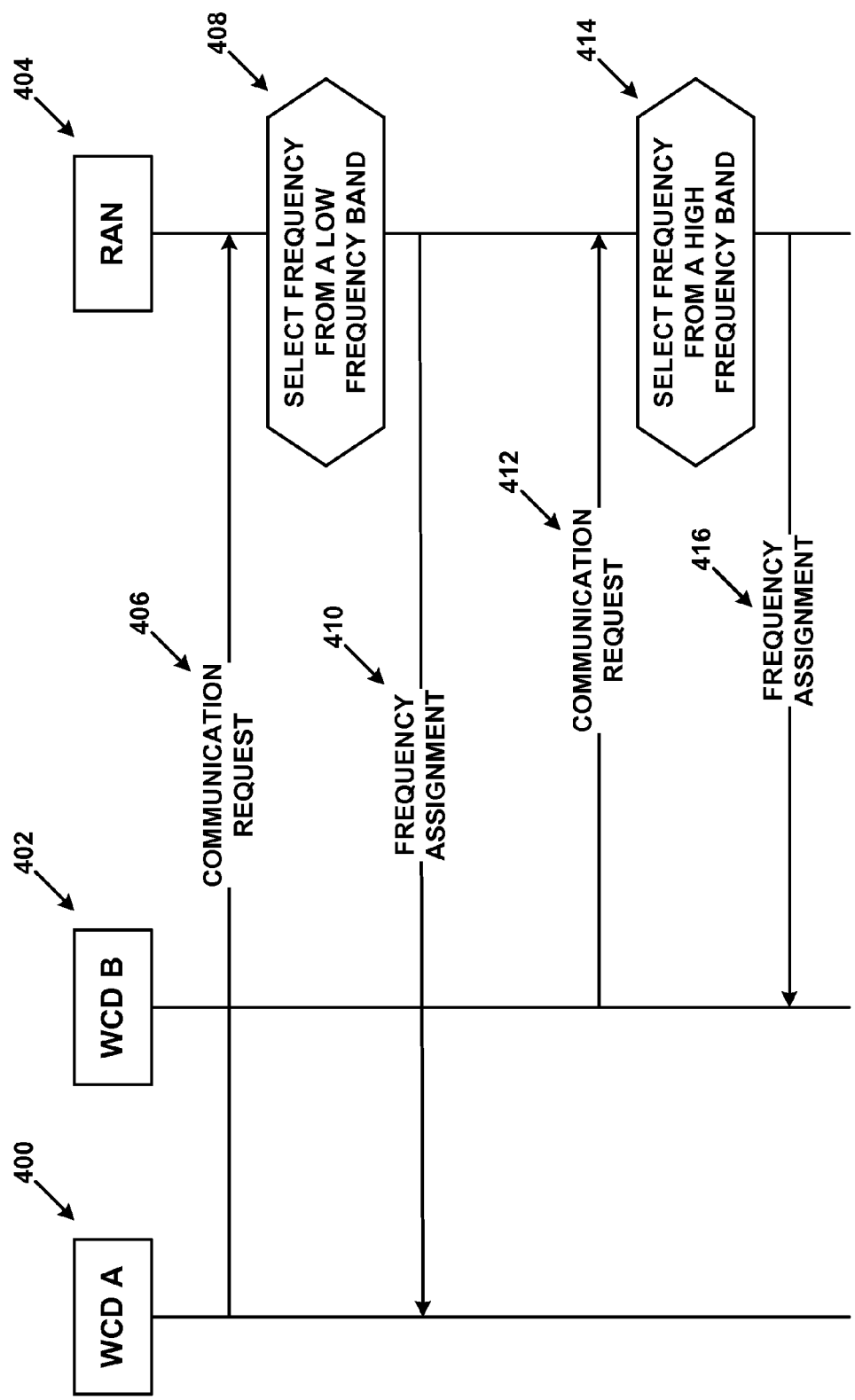
FIG. 4 is a message flow, in accordance with an example embodiment.

FIG. 4 depicts an example message flow that illustrates one or more possible embodiments. The message flow includes WCD A 400 and WCD B 402, both of which request communication via RAN 404. RAN 404 may radiate to define (and/or control) wireless coverage areas in at least two different frequency bands.

As an example, in the United States, frequencies bands for mobile wireless communications have been defined in the ranges of 698-806 MHz, 806-824 MHz, 824-849 MHz, 851-869 MHz, 869-894 MHz, 1392-1395 MHz, 1432-1435 MHz, 1710-1755 MHz, 1850-1910 MHz, 1930-1990 MHz, 2110-2155 MHz, and 2496-2690 MHz. Other bands may have been defined or may be defined in the future.

Each band may be divided into two or more sub-bands, and these bands and/or sub-bands may be referred to with a unique symbol. For instance, in some CDMA embodiments, when WCDs transmit in the frequency band of 1850-1865 MHz, the RAN transmits in the frequency band of 1930-1945 MHz. This arrangement may be referred to as band class 1, block A. However, other definitions of, and designations for, frequency bands may be possible. For sake of simplicity, the term "frequency band" may refer to any contiguous range of frequencies, including sub-bands.

At step 406, WCD A 400 may transmit a communication request to RAN 404. This communication request may seek assignment of a frequency to WCD A 400. The communication request may take various forms, such as an origination message, a probe message, a page response message, or some other type of message. Further, the communication request may be the result of WCD A 400 attempting to engage in a new call, or in a handoff.

At step 408, RAN 404 may select a frequency to assign to WCD A 400. In some embodiments, RAN 404 may be configured to select a frequency from one of two or more frequency bands. For example, RAN 404 may be configured to assign frequencies from the 806-824 MHz frequency band and the 1930-1945 MHz frequency band.

As noted previously, due to the physical properties the frequency bands, it may be beneficial for RAN 404 to allocate a frequency from one band or the other to a WCD for communication. For example, signals propagating on a frequency in the 806-824 MHz frequency band may be subject to less attenuation than signals propagating on a frequency in the 1930-1945 MHz frequency band. Consequently, communication in the 806-824 MHz frequency band may experience better signal strength, higher bit rates, less dropped calls, and/or fewer handoffs than communication in the 1930-1945 MHz frequency band.

Nonetheless, RAN 404 may not be able to assign all WCDs to the 806-824 MHz frequency band without overloading that frequency band. Therefore, RAN 404 may attempt to judiciously balance the load between the 806-824 MHz frequency band and the 1930-1945 MHz frequency band by assigning WCD A 400 a frequency in the 1930-1945 MHz frequency band by default, or assigning WCD A 400 a frequency in the 806-824 MHz frequency band if RAN 404 determines that service in the 806-824 MHz frequency band would be particularly beneficial to WCD A 400.

In making this determination, RAN 404 may consider one or more factors. For example RAN 404 may consider signal strength reports that it received from WCD A 400 (these signal strength reports may be included in the communication request of step 406, a PSMM or some other form of message). If these reports indicate that WCD A 400 receives signals from wireless coverage areas defined on frequencies in the 806-824 MHz frequency band generally with more power than WCD A 400 receives signals from wireless coverage areas defined on frequencies in the 1930-1945 MHz frequency band, the RAN may select a frequency from the 806-824 MHz frequency band for assignment to WCD A 400. On the other hand if these reports indicate that WCD A 400 receives signals from wireless coverage areas defined on frequencies in the 1930-1945 MHz frequency band generally with more power than WCD A 400 receives signals from wireless coverage areas defined on frequencies in the 806-824 MHz frequency band, the RAN may select a frequency from the 1930-1945 MHz frequency band for assignment to WCD A 400.

In some situations, RAN 404 may determine that all of the signals that WCD A 400 receives from the 806-824 MHz frequency band and the 1930-1945 MHz frequency band are at strengths below a signal strength threshold. Based on this determination, RAN 404 may select a frequency from the 806-824 MHz frequency band for assignment to WCD A 400. RAN 404 may make this selection because the 806-824 MHz frequency band generally provides better coverage than the 1930-1945 MHz frequency band. Thus, such an assignment is less likely to result in poor communication quality or a dropped call.

Additionally, the RAN may consider the type of media codecs that the WCD is capable of supporting. For instance, some WCDs are capable of supporting high-definition voice codecs that can use, e.g., sampling rates of over 8,000 Hz. Particularly, CDMA wireless networks may use one or more codecs from the Enhanced Variable Rate Codec (EVRC) family.

For instance, the EVRC-A codec operates on input speech signals sampled with 16-bit resolution 8,000 times per second (e.g., 8,000 Hz). The EVRC-B codec also operates on input speech signals sampled with 16-bit resolution 8,000 times per second, and supports the three compressed bit rates supported by EVRC-A. However, EVRC-B also supports a compressed frame size of 40 bits (2.0 kilobits per second). Additionally, EVRC-B supports eight operating points, each defining a target bit rate.

The EVRC-WB codec is a "wideband" variation of EVRC-B. Particularly, EVRC-WB operates on input speech signals sampled with 16-bit resolution at 8,000 or 16,000 times per second. Thus, EVRC-WB frames may include high frequency components from the 3.5 kHz to 7 kHz frequency range. Consequently, EVRC-WB may be capable of producing higher quality voice calls than EVRC-A or EVRC-B. Additionally, EVRC-WB supports two of the operating points of EVRC-B, and also supports a mode for improved encoding of non-speech signals, such as music-on-hold.

The EVRC-NW codec supports at least some of the encodings of both EVRC-B and EVRC-WB. Particularly, EVRC-NW supports the sampling rates and frame sizes of EVRC-WB. Also, EVRC-NW supports seven of the operating points of EVRC-B, and also supports the mode for improved encoding of non-speech signals.

Based on their respective supported sampling rates, EVRC-A and EVRC-B may be referred to as standard-definition voice codecs while EVRC-NW and EVRC-WB may be referred to as high-definition voice codecs. However, the embodiments herein are not limited to the EVRC family of media codecs, and other media codes may be used. Further, other characterizations of standard-definition codecs and high-definition codecs may be possible.

The lower attenuation rates of the low-frequency band may make it more likely that the WCD can successfully make use of an advanced media codec, such as a high-definition voice codec. Additionally, WCDs that support advanced codecs may be associated with premium-level subscriptions. Therefore, the RAN may select a frequency from the low-frequency band, if the WCD is capable of supporting an advanced codec, so as to provide an enhanced quality of service to premium-level subscribers.

The RAN may be able to determine one or more media codecs that the WCD is capable of supporting by the type of service option that the WCD includes in a communication request (e.g., an origination message, a probe message, a page response message, or some other type of message) that it transmits to the RAN. For example, service option 3 may indicate that the WCD supports EVRC-A, while service option 68 may indicate that the WCD supports EVRC-B. Also, service option 70 may indicate that the WCD supports EVRC-WB, while service option 73 may indicate that the WCD supports EVRC-NW.

Further, the RAN may consider whether the WCD is in motion. For example, if the WCD is moving faster than a threshold speed (e.g., 5 meters per second, 10 meters per second, 15 meters per second, and so on), the RAN may select a frequency from the low-frequency band. However, if the WCD is not moving faster than the threshold speed, the RAN may select a frequency from the high-frequency band. Thus, a rapidly moving WCD may be assigned to communicate on a frequency with lower attenuation. This may result in fewer handoffs and better quality communication for the WCD.

The RAN may determine the speed of the WCD in various ways. In some cases, the WCD may report its speed to the RAN. Alternatively or additionally, the WCD may report its location to the RAN periodically or from time to time. The RAN may use at least two of these reports to determine the WCD's speed. In some embodiments, the RAN may be able to estimate the WCD's location by using base-station triangulation, and then determine the WCD's speed based at least two of these estimates.

Regardless of the factors considered, at step 408, RAN 404 may select a frequency. For sake of argument, and as shown in FIG. 4, RAN 404 may select a frequency from the low-frequency band. At step 410, RAN 404 may transmit a frequency assignment to WCD A 400, instructing WCD A 400 to communicate using the selected frequency.

At step 412, RAN 404 may receive a communication request from WCD B 402. At step 414, possibly in response to receiving this communication request, RAN 404 may select a frequency to assign to WCD B 402. In doing so the RAN may consider one of more of the factors discussed above, and/or other factors. For sake of argument, and as shown in FIG. 4, RAN 404 may select a frequency from the high-frequency band. At step 410, RAN 404 may transmit a frequency assignment to WCD B 402, instructing WCD B 402 to communicate using the selected frequency.

Thus, based on various factors, a RAN may select and assign frequencies in low-frequency band for some WCDs, and frequencies in a high-frequency band for other WCDs. This process may be generalized to be carried out over more than two frequency bands.

Figure 5:
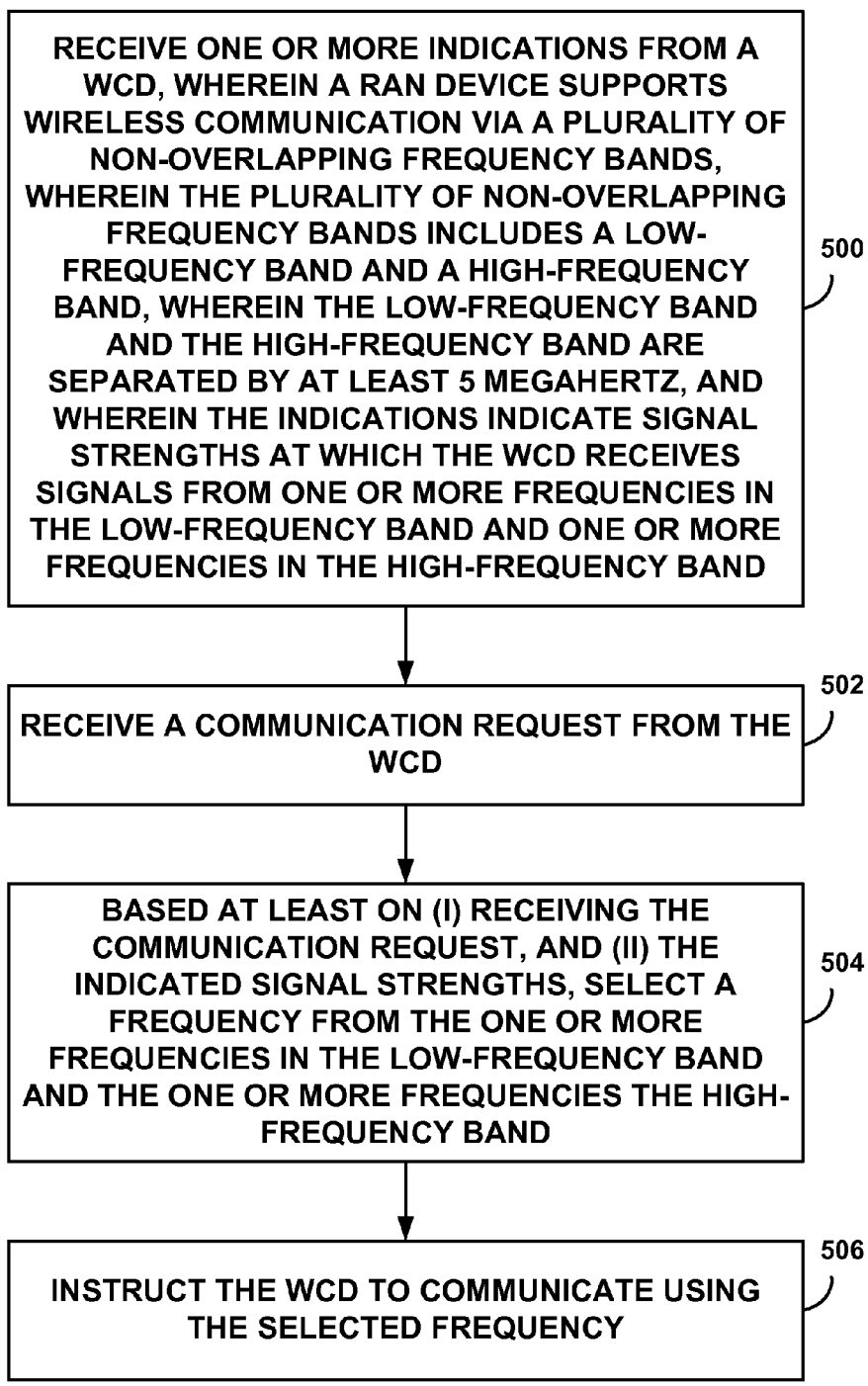
FIG. 5 is a flow chart, in accordance with an example embodiment.

FIG. 5 is a flow chart depicting an example embodiment. One or more steps of FIG. 5 may be carried out by a RAN component exemplified by RAN device 300.

At step 500, a RAN may receive one or more indications from a WCD. The RAN may support wireless communication via a plurality of non-overlapping frequency bands, and the plurality of non-overlapping frequency bands may include a low-frequency band and a high-frequency band. The low-frequency band and the high-frequency band may be separated by a range of frequencies, such as 1 or more MHz, 5 or more MHz, 10 or more MHz, 50 or more MHz, 100 or more MHz, etc. The one or more indications may indicate signal strengths at which the WCD receives signals from one or more frequencies in the low-frequency band and one or more frequencies in the high-frequency band. The WCD may transmit these indications in various types of messages, such as PSMMs, origination messages, probe messages, page response messages, and so on.

At step 502, the RAN may receive a communication request from the WCD. In some embodiments, the one or more indications may be contained within the communication request. At step 504, possibly based on (i) receiving the communication request, and (ii) the signal strengths, the RAN may select a frequency from the one or more frequencies in the low-frequency band and the one or more frequencies in the high-frequency band. At step 506, the RAN may instruct the WCD to communicate using the selected frequency.

In some embodiments, selecting the frequency may involve determining that all of the indicated signal strengths are below a signal strength threshold. Possibly based on all of the indicated signal strengths being below the signal strength threshold, the RAN may select the frequency from the low-frequency band. Additionally or alternatively, selecting the frequency may involve determining that the one or more indications indicate fewer than a threshold number of signal strengths from wireless coverage areas defined in the low-frequency band. Possibly based also on the indications representing fewer than the threshold number of signal strengths from wireless coverage areas defined in the low-frequency band, the RAN may select the frequency from the high-frequency band. In some cases, the threshold number might be 1, 2, 3, 4, 5, etc.

Further, the RAN may be configured to obtain indications of the WCD's location. Accordingly, based on previously-obtained indications of the WCD's location, the RAN may determine that the WCD has moved a distance of at least n meters over the previous t seconds, wherein n and t are both non-zero. Based on the WCD moving the distance of at least n meters over the previous t seconds, the RAN may select the frequency from the low-frequency band. In some implementations, n may be 1, 5, 10, 15, 20, etc., and t may be 1.

Moreover, the RAN may determine that the WCD is attempting to communicate using a high-definition voice codec that supports a sampling rate of over 8,000 Hz. For instance, the RAN may make this determination from a service option that the WCD might include in the communication request. Based on the WCD attempting to communicate using the high-definition voice codec, the RAN may select the frequency from the low-frequency band.

It should be understood that FIGS. 4 and 5 depict non-limiting embodiments. Thus, more or fewer steps than shown in FIGS. 4 and 5 may be used without departing from the scope of the embodiments herein. Additionally, some of these steps may be repeated one or more times, or may be omitted altogether. Further, the message flows and flow charts of these figures may be combined with one another and/or with other aspects described this specification and its accompanying drawings, in whole or in part, also without departing from the scope of the embodiments herein. For instance, any of the additional features discussed in the context of FIG. 4 may also be applied to methods illustrated by the flow chart of FIG. 5.

In the drawings, a step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by one or more processors for implementing specific logical functions or actions in the method or technique. The program code and/or related data may be stored on any type of computer-readable medium, such as a storage device, including a disk drive, a hard drive, or other storage media.

V. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:
   receiving, by a radio access network (RAN), a communication request from a wireless communication device (WCD), wherein the RAN supports wireless communication with WCDs by way of at least a low-frequency band and a high-frequency band;
   determining that the WCD is attempting to communicate using a high-definition voice codec that supports a sampling rate of over 8000 Hz;
   based on the WCD attempting to communicate using the high-definition voice codec, selecting a frequency from the low-frequency band; and
   instructing, by the RAN, the WCD to communicate with the RAN using the selected frequency.

2. The method of claim 1, the low-frequency band and the high-frequency band are separated by at least 50 megahertz.

3. The method of claim 1, wherein the RAN assigns WCDs frequencies from the high-frequency band according to a default configuration, and wherein selecting the frequency from the low-frequency band comprises:
   determining that the low-frequency band would support calls using the high-definition voice codec better than the high-frequency band; and
   overriding the default configuration when selecting the frequency from the low-frequency band.

4. The method of claim 1, wherein the high-definition voice codec is EVRC-NW or EVRC-WB.

5. The method of claim 1, wherein the RAN receives one or more indications from the WCD that indicate signal strengths at which the WCD received signals from one or more frequencies in the low-frequency band and one or more frequencies in the high-frequency band, wherein selecting the frequency from the low-frequency band is also based on:
   determining that all of the indicated signal strengths are below a signal strength threshold; and in response to all of the indicated signal strengths being below the signal strength threshold, selecting the frequency from the low-frequency band.

6. The method of claim 1, wherein the RAN is configured to obtain a speed of the WCD, and wherein selecting the frequency from the low-frequency band is also based on the speed of WCD being greater than a threshold speed.

7. The method of claim 6, wherein the threshold speed is 5 meters per second.

8. The method of claim 6, wherein the speed of the WCD is obtained by way of two or more location measurements of the WCD.

9. The method of claim 1, wherein determining that the WCD is attempting to communicate using the high-definition voice codec comprises determining that the communication requests specifies a service option that is associated with the high-definition voice codec.

10. An article of manufacture including a non-transitory computer-readable medium, having stored thereon program instructions that, upon execution by a radio access network (RAN) device, cause the RAN device to perform operations comprising:
  receiving a communication request from a wireless communication device (WCD), wherein the RAN supports wireless communication with WCDs by way of at least a low-frequency band and a high-frequency band;
  determining that the WCD is attempting to communicate using a high-definition voice codec that supports a sampling rate of over 8000 Hz;
  based on the WCD attempting to communicate using the high-definition voice codec, selecting a frequency from the low-frequency band; and
  instructing the WCD to communicate with the RAN using the selected frequency.

11. The article of manufacture of claim 10, the low-frequency band and the high-frequency band are separated by at least 50 megahertz.

12. The article of manufacture of claim 10, wherein the RAN assigns WCDs frequencies from the high-frequency band according to a default configuration, and wherein selecting the frequency from the low-frequency band comprises:
  determining that the low-frequency band would support calls using the high-definition voice codec better than the high-frequency band; and
  overriding the default configuration when selecting the frequency from the low-frequency band.

13. The article of manufacture of claim 10, wherein the high-definition voice codec is EVRC-NW or EVRC-WB.

14. The article of manufacture of claim 10, wherein the RAN receives one or more indications from the WCD that indicate signal strengths at which the WCD received signals from one or more frequencies in the low-frequency band and one or more frequencies in the high-frequency band, wherein selecting the frequency from the low-frequency band is also based on:
  determining that all of the indicated signal strengths are below a signal strength threshold; and
  in response to all of the indicated signal strengths being below the signal strength threshold, selecting the frequency from the low-frequency band.

15. The article of manufacture of claim 10, wherein the RAN is configured to obtain a speed of the WCD, and wherein selecting the frequency from the low-frequency band is also based on the speed of WCD being greater than a threshold speed.

16. A radio access network (RAN) device comprising:
  at least one processor;
  memory; and
  program instructions, stored in the memory, that upon execution by the at least one processor cause the RAN device to perform operations comprising:
    receiving a communication request from a wireless communication device (WCD), wherein the RAN supports wireless communication with WCDs by way of at least a low-frequency band and a high-frequency band;
    determining that the WCD is attempting to communicate using a high-definition voice codec that supports a sampling rate of over 8000 Hz;
    based on the WCD attempting to communicate using the high-definition voice codec, selecting a frequency from the low-frequency band; and
    instructing the WCD to communicate with the RAN using the selected frequency.

17. The computing device of claim 16, the low-frequency band and the high-frequency band are separated by at least 50 megahertz.

18. The computing device of claim 16, wherein the RAN assigns WCDs frequencies from the high-frequency band according to a default configuration, and wherein selecting the frequency from the low-frequency band comprises:
  determining that the low-frequency band would support calls using the high-definition voice codec better than the high-frequency band; and
  overriding the default configuration when selecting the frequency from the low-frequency band.

19. The computing device of claim 16, wherein the RAN receives one or more indications from the WCD that indicate signal strengths at which the WCD received signals from one or more frequencies in the low-frequency band and one or more frequencies in the high-frequency band, wherein selecting the frequency from the low-frequency band is also based on:
  determining that all of the indicated signal strengths are below a signal strength threshold; and
  in response to all of the indicated signal strengths being below the signal strength threshold, selecting the frequency from the low-frequency band.

20. The computing device of claim 16, wherein the RAN is configured to obtain a speed of the WCD, and wherein selecting the frequency from the low-frequency band is also based on the speed of WCD being greater than a threshold speed.

* * * * *